(12) United States Patent
Häberle et al.

(10) Patent No.: US 10,442,956 B2
(45) Date of Patent: Oct. 15, 2019

(54) SOLVENT-FREE POLYURETHANE LIQUID MEMBRANE

(71) Applicant: SIKA TECHNOLOGY AG, Baar (CH)

(72) Inventors: Hans Häberle, Gailingen (DE); Urs Burckhardt, Zürich (CH); Ursula Stadelmann, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 169 days.

(21) Appl. No.: 15/262,931

(22) Filed: Sep. 12, 2016

(65) Prior Publication Data

US 2017/0002231 A1 Jan. 5, 2017

Related U.S. Application Data

(63) Continuation of application No. PCT/EP2015/054970, filed on Mar. 10, 2015.

(30) Foreign Application Priority Data

Mar. 11, 2014 (EP) .................................. 14158951.5

(51) Int. Cl.
| | | |
|---|---|---|
| *C09D 175/08* | (2006.01) | |
| *C08G 18/32* | (2006.01) | |
| *C08G 18/63* | (2006.01) | |
| *C08G 18/65* | (2006.01) | |
| *C08G 18/66* | (2006.01) | |
| *C08G 18/76* | (2006.01) | |
| *C08G 18/80* | (2006.01) | |
| *C08G 18/08* | (2006.01) | |
| *C08G 18/12* | (2006.01) | |
| *C08G 18/22* | (2006.01) | |
| *C08G 18/36* | (2006.01) | |
| *C08G 18/40* | (2006.01) | |
| *E04F 15/12* | (2006.01) | |

(52) U.S. Cl.
CPC ....... *C09D 175/08* (2013.01); *C08G 18/0857* (2013.01); *C08G 18/0876* (2013.01); *C08G 18/12* (2013.01); *C08G 18/222* (2013.01); *C08G 18/3206* (2013.01); *C08G 18/3256* (2013.01); *C08G 18/36* (2013.01); *C08G 18/4072* (2013.01); *C08G 18/632* (2013.01); *C08G 18/657* (2013.01); *C08G 18/6564* (2013.01); *C08G 18/6685* (2013.01); *C08G 18/7671* (2013.01); *C08G 18/807* (2013.01); *E04F 15/12* (2013.01)

(58) Field of Classification Search
None
See application file for complete search history.

(56) References Cited

U.S. PATENT DOCUMENTS

| | | | |
|---|---|---|---|
| 5,091,497 A * | 2/1992 | Grogler | C08G 18/0876 528/76 |
| 2009/0099333 A1* | 4/2009 | Burckhardt | C07C 251/08 528/310 |

OTHER PUBLICATIONS

International Preliminary Report on Patentability and Written Opinion of the International Searching Authority (Forms PCT/IB/338, PCT/IB/373 and PCT/ISA/237) dated Sep. 22, 2016, by the International Bureau of WIPO, in corresponding International Application No. PCT/JP2015/054970. (6 pages).
International Search Report (PCT/ISA/210) dated May 28, 2015, by the European Patent Office as the International Searching Authority for International Application No. PCT/EP2015/054970.
Written Opinion (PCT/ISA/237) dated May 28, 2015, by the European Patent Office as the International Searching Authority for International Application No. PCT/EP2015/054970.

* cited by examiner

*Primary Examiner* — Jeffrey D Washville
(74) *Attorney, Agent, or Firm* — Oliff PLC

(57) ABSTRACT

The present disclosure relates to a two-component composition containing a polymer polyol, a dial chain extender, an aldimine of formula (I), optionally additional polyols and diphenylmethandiisocyanates in the two components. The composition is particularly suitable as a manually applicable solvent-free liquid film for coating and/or sealing floors and roofs. It also has a long open time, cures quickly and without complications in a wide temperature and humidity range, has a high level of strength and is weather resistant.

20 Claims, No Drawings

SOLVENT-FREE POLYURETHANE LIQUID MEMBRANE

RELATED APPLICATION

This application claims priority as a continuation application under 35 U.S.C. § 120 to PCT/EP2015/054970, which was filed as an International Application on Mar. 10, 2015 designating the U.S., and which claims priority to European Application 14158951.5 filed in Europe on Mar. 11, 2014. The entire contents of these applications are hereby incorporated by reference in their entireties.

FIELD

The present disclosure relates to a reactive polyurethane composition which can be applied in liquid form at room temperature and which can, for example, be used as a coating in order to seal construction work in respect of ingress of water.

BACKGROUND INFORMATION

For quite some time reactive polyurethane compositions have been known which can be applied in liquid form and which are used as coatings that provide bridging over cracks in order to seal construction work in respect of ingress of water; they are also termed liquid membranes. In comparison with prefabricated polymer webs, they provide easier application, in particular when surfaces are uneven or have complex geometry, they improve protection from below-surface migration by virtue of adhesion to the substrate across the entire area, and they also provide seamless laying. In comparison with non-reactive systems applied in liquid form, for example polymer solutions, aqueous polymer dispersions, or bitumen-based products, they feature high strength and good resilience, even at low temperatures, have low susceptibility to soiling, and provide durable sealing even under standing water.

The properties of a hardened liquid membrane in providing bridging over cracks over a wide temperature range are important for reliable prevention of water ingress into construction work. In order to achieve this, the hardened material should have high extensibility, high strength, and good tear strength. A rather low value for modulus of elasticity is advantageous here, in order that movements caused by way of example by temperature variation or vibrations in the construction work do not give rise to stresses in the membrane that are excessive and that can cause separation of the membrane from the substrate or cohesive fracture within the substrate. The latter can be especially critical in the case of substrates having low resistance to pressure, an example being insulation foam.

The expression polyurethane liquid membranes covers not only one-component systems but also two-component systems. Curing of one-component polyurethane liquid membranes is brought about by moisture, and takes place from the outside toward the inside, and these membranes therefore require a relatively long time for complete curing throughout the material, in particular when thick layers are used, the environment is dry, or there is restricted availability of moisture; this can impact on subsequent operations. Commercially available products moreover include considerable content of volatile organic solvents, firstly in order to increase shelf life, and secondly in order to reduce viscosity and thus improve ease of use. For this reason, they emit VOC, discernible by their strong odor, and they exhibit a degree of shrinkage.

In contrast to this, two-component polyurethane liquid membranes, even those with high solids content, have comparatively low viscosity, and are therefore easy to apply; they also cure rapidly throughout the material, even when the materials are relatively thick. However, during hardening they are very sensitive to moisture and temperature. If humidity is high, in particular when this is combined with high temperatures, or the substrate is damp, or there is direct contact with water, evolution of $CO_2$ can form bubbles; this leads to foaming of the coating, and impairs its sealing function and robustness; in warm conditions they have a short open time, and at low temperatures they cure very slowly or remain soft and tacky. Furthermore, many known two-component products include solvents and/or volatile isocyanates, and can impact on protection of the environment and prevention of health hazards.

SUMMARY

A composition is disclosed which is composed of: a first component comprising: at least one polymer polyol which is a dispersion of a polymer that is solid at room temperature in a polyether polyol that is liquid at room temperature, at least one diol chain extender and optionally other polyols; and a second component comprising: diphenylmethane diisocyanate; where at least one of the two components additionally comprises at least one aldimine of the formula (I),

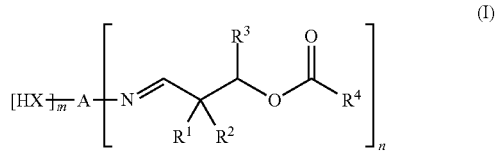

where A is an (m+n)-valent hydrocarbon moiety which optionally comprises ether units and which has from 2 to 20 C atoms, X is O or N—$R^5$, $R^1$ and $R^2$ are mutually independently respectively a monovalent hydrocarbon moiety having from 1 to 12 C atoms, or together are a divalent hydrocarbon moiety which has from 4 to 12 C atoms and which is part of an optionally substituted carbocyclic ring having from 5 to 8; $R^3$ is a hydrogen atom or is an alkyl or arylalkyl or alkoxycarbonyl moiety having from 1 to 12 C atoms; $R^4$ is a monovalent hydrocarbon moiety which has from 6 to 20 C atoms and which optionally comprises ether units or aldehyde units; $R^5$ is a monovalent hydrocarbon moiety which has from 1 to 30 C atoms and which optionally comprises at least one carboxylic ester group, nitrile group, nitro group, phosphonic ester group, sulfonic group or sulfonic ester group, or a group of the formula

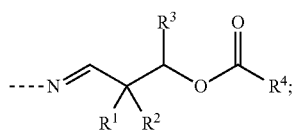

and
m is 0 or 1, and n is 1 or 2 or 3, with the proviso that m+n is 2 or 3.

DETAILED DESCRIPTION

Exemplary solvent-free polyurethane compositions are disclosed which have little odor and which contain no volatile isocyanates, which are suitable as two-component liquid membrane for the sealing of construction work, and which exhibit long shelf life of the components, excellent ease of use in manual application, rapid and problem-free hardening over a wide range of temperature and of moisture level, and good weathering resistance.

Surprisingly it has been found that a composition as disclosed herein can achieve the foregoing effects. It is free from solvents and from volatile isocyanates such as TDI or IPDI, and from substances having strong odor, and it has a long open time with very low viscosity, and therefore has excellent suitability for manual application. The combination of polymer polyol, diol chain extender, and aldimine, the latter having little to no odor, with non-volatile MDI in the second component provides access to very low viscosity with long open time, excellent curing throughout the material with almost no formation of bubbles, excellent mechanical properties, with high strength and extensibility, with low modulus of elasticity, and good weathering resistance of the hardened material.

It is particularly surprising here that, despite the high reactivity of MDI, and the diol chain extender, the composition has a long open time, and hardens substantially without the presence of bubbles, and moreover develops very good mechanical properties, although the plasticizing aldehyde remains within the composition.

It is moreover particularly surprising that, by virtue of the polymer polyol, the tensile strength of the composition is significantly increased, while modulus of elasticity either rises insignificantly or remains approximately the same, or actually decreases; this is particularly advantageous for applications on substrates having low resistance to pressure, for example insulation foams.

A composition as disclosed herein can be composed of a first component comprising:
at least one polymer polyol which is a dispersion of a polymer that is solid at room temperature in a polyether polyol that is liquid at room temperature,
at least one diol chain extender
and optionally other polyols;
and a second component comprising diphenylmethane diisocyanate;
where at least one of the two components additionally comprises at least one aldimine of the formula (I),

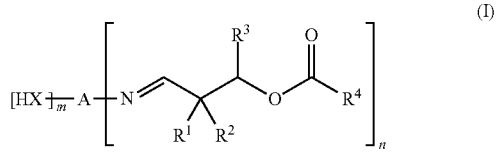

(I)

where
A is an (m+n)-valent hydrocarbon moiety which optionally comprises ether units and which has from 2 to 20 C atoms,
X is O or N—$R^5$,
$R^1$ and $R^2$ are mutually independently respectively a monovalent hydrocarbon moiety having from 1 to 12 C atoms, or together are a divalent hydrocarbon moiety which has from 4 to 12 C atoms and which is part of an optionally substituted carbocyclic ring having from 5 to 8, preferably 6, C atoms;

$R^3$ is a hydrogen atom or is an alkyl or arylalkyl or alkoxycarbonyl moiety having from 1 to 12 C atoms;
$R^4$ is a monovalent hydrocarbon moiety which has from 6 to 20 C atoms and which optionally comprises ether units or aldehyde units;
$R^5$ is a monovalent hydrocarbon moiety which has from 1 to 30 C atoms and which optionally comprises at least one carboxylic ester group, nitrile group, nitro group, phosphonic ester group, sulfonic group or sulfonic ester group, or a group of the formula

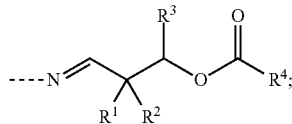

and
m is 0 or 1, and n is 1 or 2 or 3, with the proviso that m+n is 2 or 3.

The expression "diol chain extender" means an organic diol which is not a polymer.

The expression "diphenylmethane diisocyanate", abbreviated to "MDI", means any of the isomeric forms of diphenylmethane diisocyanate and any desired mixture thereof, in particular diphenylmethane 4,4'-diisocyanate, diphenylmethane 2,4'-diisocyanate, and diphenylmethane 2,2'-diisocyanate.

A broken line in the formulae in this document always represents the bond between a substituent and the associated molecular moiety.

The expression "primary hydroxy group" means an OH group bonded to a C atom having two hydrogens.

The expression "primary amino group" means an $NH_2$ group bonded to an organic moiety, and the expression "secondary amino group" means an NH group bonded to two organic moieties, which can also together be part of a ring.

The term "viscosity" in the present document means dynamic viscosity or shear viscosity, defined via the ratio between shear stress and shear rate (velocity gradient) and determined as described in DIN EN ISO 3219.

The expression "molecular weight" in the present document means the molecular weight (in grams per mole) of a molecule. The expression "average molecular weight" means the number average $M_n$ of an oligomeric or polymeric mixture of molecules, usually determined by means of gel permeation chromatography (GPC) against polystyrene as standard.

The expression "storage-stable" or "storable" is applied to a substance or a composition if, when suitably packaged, it can be stored at room temperature for a relatively long time, for example for at least 3 months up to 6 months or more, and that this storage does not cause its usage properties to change to an extent that is relevant for its use.

The expression "room temperature means a temperature of about 23° C.

The first component of the composition includes at least one polymer polyol which is a dispersion of a polymer that is solid at room temperature in a polyether polyol that is liquid at room temperature.

It is, for example, preferable that the average particle size of the solid polymer is at most 5 μm. It is particularly preferable that the average particle size is, for example, below 2 μm, in particular in the range from 0.1 to 1 μm.

Suitable polymer polyols are polyether polyols including polymers and/or copolymers of vinylic monomers such as in particular acrylonitrile, styrene, α-methylstyrene, methyl (meth)acrylate or hydroxyethyl (meth)acrylate, and also polyureas/polyhydrazodicarbonamides (PHD) and polyurethanes, where the two phases form a stable, storable dispersion, and the polymer can have been partially grafted onto the polyether polyol, or can have been partially covalently bonded to the polyether polyol.

Preference is given to polymer polyols where the solid polymer is a copolymer of acrylonitrile and styrene (SAN) or is a polyurea/polyhydrazodicarbonamide (PHD) or is a polyurethane. These polymer polyols are particularly easy to produce, and are storable. Very particular preference is given to SAN. This material is particularly hydrophobic, and is therefore advantageous in combination with isocyanates.

The polyether polyol of the polymer polyol is, for example, preferably a polyoxyalkylene polyol produced via ring-opening polymerization of oxiranes, in particular ethylene oxide and/or propylene 1,2-oxide, with the aid of a starter molecule having two or more active hydrogen atoms, in particular water, glycols such as 1,2-ethanediol, 1,2- and 1,3-propanediol, neopentyl glycol, diethylene glycol, triethylene glycol, polyethylene glycols, dipropylene glycol, tripropylene glycol, or polypropylene glycols, or triols, in particular glycerol or 1,1,1-trimethylolpropane, or sugar alcohols, in particular sorbitol (D-glucitol), or diphenols, in particular bisphenol A, or amines, in particular ammonia, ethylenediamine or aniline, or a mixture thereof.

It is particularly preferably a polyoxyalkylene polyol, in particular a polyoxypropylene polyol or an ethylene-oxide-terminated ("EO-end-capped") polyoxypropylene polyol.

The molecular weight of the polyether polyol of the polymer polyol is, for example, preferably in the range from 400 to 8000 g/mol, in particular from 1000 to 6000 g/mol.

The average OH functionality of the polyether polyol of the polymer polyol is, for example, preferably in the range from 1.75 to 3.5, in particular from 2.25 to 3.0.

It is most preferable that the polyether polyol of the polymer polyol is, for example, an ethylene-oxide-terminated polyoxypropylenetriol with molecular weight in the range from 1000 to 6000 g/mol. This type of polymer polyol has mainly primary hydroxy groups, is relatively hydrophobic, and has OH-functionality greater than 2, thus being particularly suitable for combination with isocyanates.

The polymer polyol can be composed of any desired combination of the solid polymers mentioned and of the polyether polyols mentioned.

A very particularly preferred exemplary polymer polyol is an ethylene-oxide-terminated polyoxypropylenetriol with molecular weight in the range from 1000 to 6000 g/mol comprising an SAN polymer.

The content of solid polymer in the polymer polyol is, for example, preferably in the range from 10 to 50% by weight.

Preferred polymer polyols are commercially available products which are used mainly for production of flexible polyurethane foams, in particular the SAN polyols Lupranol® 4003/1, Lupranol® 4006/1/SC10, Lupranol® 4006/1/SC15, Lupranol® 4006/1/SC25, Lupranol® 4010/1/SC10, Lupranol® 4010/1/SC15, Lupranol® 4010/1/SC25, Lupranol® 4010/1/SC30, or Lupranol® 4010/1/SC40 (all from BASF), Desmophen® 5027 GT, or Desmophen® 5029 GT (both from Bayer MaterialScience), Voralux® HL106, Voralux® HL108, Voralux® HL109, Voralux® HL120, Voralux® HL400, Voralux® HN360, Voralux® HN370, Voralux® HN380, or Specflex® NC 700 (all from Dow), Caradol® SP27-25, Caradol® SP30-15, Caradol® SP30-45, Caradol® SP37-25, Caradol® SP42-15, Caradol® SP44-10, or Caradol® MD22-40 (all from Shell), and also the PHD polyol Desmophen® 5028 GT (from Bayer MaterialScience).

Among these, particular preference is given to the SAN polyols, in particular the commercially available products mentioned.

The first component of the composition moreover includes at least one diol chain extender.

It is preferable that the diol chain extender is, for example, an aliphatic or cycloaliphatic diol with molecular weight in the range from 60 to 200 g/mol.

The diol chain extender preferably contains at least one primary hydroxy group.

Suitable diol chain extenders are selected from the group consisting of 1,2-ethanediol, 1,2-propanediol, 1,3-propanediol, 1,2-butanediol, 1,3-butanediol, 1,4-butanediol, 2,3-butanediol, 2-methyl-1,3-propanediol, 1,5-pentanediol, 1,2-pentanediol, 2,4-pentanediol, 2-methyl-1,4-pentanediol, 2,2-dimethyl-1,3-propanediol (neopentyl glycol), 1,6-hexanediol, 1,2-hexanediol, 3-methyl-1,5-pentanediol, 1,8-octanediol, 1,2-octanediol, 3,6-octanediol, 2-ethyl-1,3-hexanediol, 2,2,4-trimethyl-1,3-pentanediol, 2-butyl-2-ethyl-1,3-propanediol, 2,7-dimethyl-3,6-octanediol, 1,4-cyclohexanediol, 1,3-cyclohexanedimethanol, 1,4-cyclohexanedimethanol, diethylene glycol and dipropylene glycol.

Among these, particular preference is given to products that are liquid at room temperature and have primary OH groups, in particular 1,2-ethanediol, 1,3-propanediol, 1,4-butanediol, 2-methyl-1,3-propanediol, 1,5-pentanediol, 3-methyl-1,5-pentanediol, and diethylene glycol.

1,4-Butanediol is for example, a most preferred as diol chain extender.

The quantity of the diol chain extender present in the composition is, for example, preferably such that from 20% to 80%, preferably from 30% to 70%, of the isocyanate groups present can crosslink by way of the diol chain extender.

The first component of the composition optionally includes other polyols.

Suitable other exemplary polyols are in particular the following:
polyoxyalkylene polyols, also termed polyether polyols, these being polymerization products of ethylene oxide, propylene 1,2-oxide, butylene 1,2-oxide, or butylene 2,3-oxide, oxetane, tetrahydrofuran, or a mixture thereof, possibly polymerized with the aid of a starter molecule having two or more active hydrogen atoms. Ethylene-oxide-terminated polyoxypropylene polyols are specifically suitable.

Polyester polyols, in particular from polycondensation of hydroxycarboxylic acids, and in particular those produced from di- to trihydric, in particular dihydric, alcohols such as ethylene glycol, diethylene glycol, propylene glycol, dipropylene glycol, neopentyl glycol, 1,4-butanediol, 1,5-pentanediol, 3-methyl-1,5-hexanediol, 1,6-hexanediol, 1,8-octanediol, 1,10-decanediol, 1,12-dodecanediol, 1,12-hydroxystearyl alcohol, 1,4-cyclohexanedimethanol, dimer fatty acid diol (dimer diol), neopentyl glycol hydroxypivalate, glycerol, 1,1,1-trimethylolpropane, or a mixture of the abovementioned alcohols, with organic di- or tricarboxylic acids, in particular dicarboxylic acids, or their anhydrides or esters, particular examples being succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid or trimellitic anhydride, or a mixture of the abovementioned acids, and also polyester polyols derived from lactones, a particular example being ε-caprolactone, and from starters such as the abovementioned di- or trihydric alcohols.

Particularly suitable polyester polyols are polyesterdiols.

Polycarbonate polyols as obtainable via reaction, for example, of the abovementioned alcohols, these being those used in the structure of the polyester polyols, with dialkyl carbonates, or with diaryl carbonates or phosgene.

Block copolymers which bear at least two hydroxy groups and comprise at least two different blocks with polyether, polyester, and/or polycarbonate structure of the type described above, in particular polyether polyester polyols.

Polyacrylate polyols and polymethacrylate polyols.

Polyhydroxy-functional fats and oils, for example natural fats and oils, in particular castor oil; or polyols—termed oleochemical polyols—obtained via chemical modification of natural fats and oils, for example the epoxypolyesters/epoxypolyethers obtained via epoxidation of unsaturated oils and subsequent ring-opening with carboxylic acids/alcohols, or polyols obtained via hydroformylation and hydrogenation of unsaturated oils; or polyols obtained from natural fats and oils via degradation processes such as alcoholysis or ozonolysis, and subsequent chemical linkage, for example via transesterification or dimerization, of the resultant degradation products or derivatives thereof. Suitable degradation products of natural fats and oils are in particular fatty acids and fatty alcohols, and also fatty acid esters, in particular the methyl esters (FAME), where these can by way of example be derivatized via hydroformylation and hydrogenation to give hydroxy fatty acid esters.

Polyhydrocarbon polyols, also termed oligohydrocarbonols, for example polyhydroxy-functional polyolefins, polyisobutylenes, polyisoprenes; polyhydroxy-functional ethylene-propylene, ethylene-butylene, or ethylene-propylene-diene copolymers, for example those produced by Kraton Polymers; polyhydroxy-functional polymers of dienes, in particular of 1,3-butadiene, where these can in particular also derive from anionic polymerization; polyhydroxy-functional copolymers of dienes such as 1,3-butadiene, or of diene mixtures and vinyl monomers such as styrene, acrylonitrile, vinyl chloride, vinyl acetate, vinyl alcohol, isobutylene, and isoprene, examples being polyhydroxy-functional acrylonitrile/butadiene copolymers of the type that can be produced by way of example from epoxides or from aminoalcohols and from carboxy-terminated acrylonitrile/butadiene copolymers (obtainable commercially by way of example as Hypro® (previously Hycar®) CTBN and CTBNX and ETBN from Nanoresins AG, Germany or Emerald Performance Materials LLC); and also hydrogenated polyhydroxy-functional polymers or copolymers of dienes.

The average molecular weight of the abovementioned polyols is, for example, preferably in the range from 400 to 8000 g/mol, in particular from 1000 to 6000 g/mol, their average OH-functionality being in the range from 1.6 to 4.

The composition preferably includes at least one other polyol which is a polyether polyol or a poly(meth)acrylate polyol, or a polyhydroxy-functional fat or oil.

It is particularly preferable that the composition includes, as other polyol, an ethylene-oxide-terminated polyoxypropylenedi- or triol and/or castor oil.

It is preferable that the proportion of solid polymer from the polymer polyol, based on the entirety of polymer polyol and optionally present other polyols, is in the range from for example, 5 to 30% by weight, in particular from 8 to 25% by weight. This type of composition is easy to use and has high strength.

The second component of the composition includes diphenylmethane diisocyanate (MDI). The following are preferred as MDI: diphenylmethane 4,4'-diisocyanate (4,4'-MDI), diphenylmethane 2,4'-diisocyanate (2,4'-MDI) and/or diphenylmethane 2,2'-diisocyanate (2,2'-MDI). Particular preference is given to 4,4'-MDI. This permits achievement of particularly high strength values.

The content of monomeric diphenylmethane diisocyanate in the second component is, for example, preferably in the range from 20 to 100% by weight, particularly preferably from 40 to 100% by weight, in particular from 60 to 100% by weight.

The MDI is preferably present in a form that is liquid at room temperature, with high content of 4,4'-MDI. The material known as "liquid MDI" is either 4,4'-MDI liquefied via partial chemical modification—in particular carbodiimidization/uretonimine formation or adduct formation with polyols—or is a mixture, specifically produced via blending or resulting from the production process, of 4,4'-MDI with other MDI isomers (2,4'-MDI and/or 2,2'-MDI), MDI oligomers, or MDI homologs.

Preference is given to monomeric MDI products with a relatively high proportion of 2,4'-MDI, for example the commercially obtainable products Desmodur® 2424 (from Bayer MaterialScience) or Lupranat® MI (from BASF), and also mixtures of monomeric MDI with MDI homologs with a small proportion of homologs, for example the commercially obtainable products Desmodur® VL50 (from Bayer MaterialScience) or Voranate® M 2940 (from Dow), and also partially carbodiimidized 4,4'-MDI, for example the commercially obtainable products Desmodur® CD (from Bayer MaterialScience), Lupranat® MM 103 (from BASF), Isonate® M 143 or Isonate® M 309 (both from Dow), Suprasec® 2020 or Suprasec® 2388 (both from Huntsman), and also MDI products known as quasi-prepolymers, involving some proportion of adducts with polyols/polyhydric alcohols such as trimethylolpropane, for example the commercially obtainable products Desmodur® VH20N, Desmodur® E21, Desmodur® E210 (all from Bayer Material-Science), Lupranat® MP 102 (from BASF), Echelon™ MP 107, Echelon™ MP 106 or Echelon™ MP 102 (all from Dow). The isocyanate content of these quasi-prepolymers is preferably in the range from 10 to 30% by weight, in particular from 15 to 28% by weight.

It is particularly preferable that the MDI takes the form of partially carbodiimidized 4,4'-MDI and/or takes the form of 4,4'-MDI involving some proportion of adducts with polyols/polyhydric alcohols.

It is preferable that the isocyanate content of the second component of the composition is, for example, in the range from 10 to 33.6% by weight, particularly from 15 to 33.6% by weight, in particular from 20 to 33.6% by weight. This type of second component can have very low viscosity, and can successfully dilute the first component, so that the composition is very easy to use.

The composition moreover includes at least one aldimine of the formula (I).

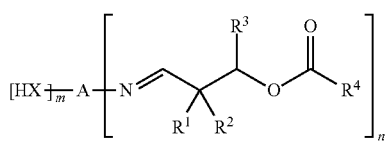

It is preferable that A is a moiety selected from the group consisting of 2-methyl-1,5-pentylene; 1,6-hexylene; 2,2(4),4-trimethyl-1,6-hexamethylene; 1,8-octylene; 1,10-decylene; 1,12-dodecylene; (1,5,5-trimethylcyclohexan-1-yl)methane-1,3; 1,3-cyclohexylenebis(methylene); 1,4-cyclohexylenebis(methylene); 1,3-phenylenebis(methylene); 2- and/or 4-methyl-1,3-cyclohexylene; 3-oxa-1,5-pentylene; 3,6-dioxa-1,8-octylene; 4,7-dioxa-1,10-decylene; α,ω-polyoxypropylene with molecular weight in the range from 170 to 450 g/mol; and trimethylolpropane-started tris(ω-polyoxypropylene) with average molecular weight in the range from 330 to 450 g/mol.

A is particularly preferably 1,6-hexylene; (1,5,5-trimethylcyclohexan-1-yl)methane-1,3; 3-oxa-1,5-pentylene; α,ω-polyoxypropylene with average molecular weight about 200 g/mol, or trimethylolpropane-started tris(w-polyoxypropylene) with average molecular weight about 390 g/mol.

A is most preferably 1,6-hexylene or (1,5,5-trimethylcyclohexan-1-yl)methane-1,3. Particularly high strength values are achieved with 1,6-hexylene, and particularly long open times are achieved with (1,5,5-trimethylcyclohexan-1-yl)methane-1,3.

It is preferable that $R^1$ and $R^2$ are respectively methyl.
It is preferable that $R^3$ is hydrogen.
It is preferable that $R^4$ is a linear alkyl moiety having from 11 to 20 C atoms, in particular a linear alkyl moiety having 11 C atoms.

These aldimines are practically odorless before, during and after hydrolytic activation and crosslinking with isocyanates.

It is preferable that m is 0 and that n is 2 or 3, in particular 2.

In the event that m is 1, it is preferable that n is 1.
In the event that m is 1, it is preferable that X is O.

An aldimine of the formula (I) is in particular obtainable from the condensation reaction of at least one primary amine of the formula (II) with at least one aldehyde of the formula (III).

$$[HX]_m\text{-}A\text{-}(NH_2)_n \quad (II)$$

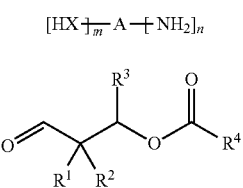

The definitions of m, n, A, X, $R^1$, $R^2$, $R^3$, and $R^4$ in the formulae (II) and (III) are those previously mentioned.

The quantity of the aldehyde of the formula (III) used in this condensation reaction is preferably stoichiometric or more than stoichiometric, based on the primary amino groups of the amine of the formula (II). The reaction is advantageously carried out at a temperature in the exemplary range from 15 to 120° C., optionally in the presence of a solvent, or else without solvent. The water liberated is preferably removed, for example azeotropically by means of a suitable solvent, or directly from the reaction mixture via application of vacuum.

Suitable amines of the formula (II) are aliphatic, cycloaliphatic and aromatic amines, in particular the following:

aminoalcohols such as in particular 2-aminoethanol, 2-amino-1-propanol, 1-amino-2-propanol, 3-amino-1-propanol, 4-amino-1-butanol, 4-amino-2-butanol, 2-amino-2-methylpropanol, 5-amino-1-pentanol, 6-amino-1-hexanol, 7-amino-1-heptanol, 8-amino-1-octanol, 10-amino-1-decanol, 12-amino-1-dodecanol, 4-(2-aminoethyl)-2-hydroxyethylbenzene, 3-aminomethyl-3,5,5-trimethylcyclohexanol, compounds bearing one primary amino group and deriving from glycols, for example from diethylene glycol, dipropylene glycol, or dibutylene glycol, or from higher oligomers of these glycols, in particular 2-(2-aminoethoxy)ethanol, 2-(2-(2-aminoethoxy)ethoxy)ethanol, or products from monocyanoethylation and subsequent hydrogenation of glycols, in particular 3-(2-hydroxyethoxy)propylamine, 3-(2-(2-hydroxyethoxy)ethoxy)propylamine, or 3-(6-hydroxyhexyloxy)propylamine;

primary-secondary amines such as in particular N-methyl-1,2-ethanediamine, N-ethyl-1,2-ethanediamine, N-butyl-1,2-ethanediamine, N-hexyl-1,2-ethanediamine, N-(2-ethylhexyl)-1,2-ethanediamine, N-cyclohexyl-1,2-ethanediamine, 4-aminomethylpiperidine, 3-(4-aminobutyl)piperidine, N-methyl-1,3-propanediamine, N-ethyl-1,3-propanediamine, N-butyl-1,3-propanediamine, N-hexyl-1,3-propanediamine, N-(2-ethylhexyl)-1,3-propanediamine, N-dodecyl-1,3-propanediamine, N-cyclohexyl-1,3-propanediamine, 3-methylamino-1-pentylamine, 3-ethylamino-1-pentylamine, 3-butylamino-1-pentylamine, 3-hexylamino-1-pentylamine, 3-(2-ethylhexyl)amino-1-pentylamine, 3-dodecylamino-1-pentylamine, 3-cyclohexylamino-1-pentylamine, diethylenetriamine (DETA), dipropylenetriamine (DPTA), N-(2-aminoethyl)-1,3-propanediamine (N3-amine), bishexamethylenetriamine (BHMT), N3-(3-aminopentyl)-1,3-pentanediamine, N5-(3-aminopropyl)-2-methyl-1,5-pentanediamine, or N5-(3-amino-1-ethylpropyl)-2-methyl-1,5-pentanediamine;

primary di- and triamines such as in particular ethylenediamine, 1,2- and 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methylpentane (MPMD), 2-butyl-2-ethyl-1,5-pentanediamine (C11-neodiamine), 1,6-hexanediamine, 2,5-dimethyl-1,6-hexanediamine, 2,2,4- and 2,4,4-trimethylhexamethylenediamine (TMD), 1,7-heptanediamine, 1,8-octanediamine, 1,9-nonanediamine, 1,10-decanediamine, 1,11-undecanediamine, 1,12-dodecandiamine, 1,2-, 1,3- and 1,4-diaminocyclohexane, bis(4-aminocyclohexyl)methane, bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane, 1-amino-3-aminomethyl-3,5,5-trimethylcyclohexane (=isophoronediamine), 2- and 4-methyl-1,3-diaminocyclohexane and mixtures thereof, 1,3-bis(aminomethyl)cyclohexane, 1,4-bis(aminomethyl)cyclohexane, 2,5(2,6)-bis(aminomethyl)

bicyclo[2.2.1]heptane (NBDA), 3(4),8(9)-bis(aminomethyl)tricyclo[5.2.1.0$^{2,6}$]decane, 1,4-diamino-2,2,6-trimethylcyclohexane (TMCDA), 1,8-menthanediamine, 3,9-bis(3-aminopropyl)-2,4,8,10-tetraoxaspiro[5.5]undecane, 1,3-bis(aminomethyl) benzene, 1,4-bis(aminomethyl)benzene, bis(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine, cycloaliphatic diamines which contain ether groups and derive from propoxylation and subsequent amination of 1,4-dimethylolcyclohexane, obtainable in particular as Jeffamine® RFD-270 (from Huntsman), polyoxyalkyleneamines with average molecular weight in the range from 200 to 500 g/mol, as are obtainable commercially by way of example with trademark Jeffamine® (from Huntsman), polyetheramines (from BASF), and PC Amine® (from Nitroil), characterized in that they bear 2-aminopropyl or 2-aminobutyl end groups, in particular Jeffamine® D-230, Jeffamine® D-400, Jeffamine® XTJ-582, Jeffamine® HK-511, Jeffamine® T-403, or Jeffamine® XTJ-566 (all from Huntsman), or products analogous thereto from BASF and Nitroil;

aromatic polyamines such as in particular 1,3-phenylenediamine, 1,4-phenylenediamine, 4,4'-, 2,4', and 2,2'-diaminodiphenylmethane, 2,4- and 2,6-tolylenediamine, mixtures of 3,5-diethyl-2,4- and -2,6-tolylenediamine (DETDA), 3,5-dimethylthio-2,4- and -2,6-tolylenediamine, 3,3',5,5'-tetraethyl-4,4'-diaminodiphenylmethane (M-DEA), 3,3'-diisopropyl-5,5'-dimethyl-4,4'-diaminodiphenylmethane (M-MIPA) or 3,3',5,5'-tetraisopropyl-4,4'-diaminodiphenylmethane (M-DIPA).

Preferred amines of the formula (II) are selected from the group consisting of 1,5-diamino-2-methylpentane, 1,6-hexanediamine, 2,2,4- and 2,4,4-trimethylhexamethylenediamine, 1,8-octanediamine, 1,10-decanediamine, 1,12-dodecanediamine, 1-amino-3-aminomethyl-3,5,5-trimethylcyclohexane, 1,3-bis(aminomethyl)cyclohexane, 1,4-bis(aminomethyl)cyclohexane, 1,3-bis(aminomethyl) benzene, 2- and/or 4-methyl-1,3-diaminocyclohexane, 2-(2-aminoethoxy)ethanol, 3,6-dioxaoctane-1,8-diamine, 4,7-dioxadecane-1,10-diamine, and polyoxypropyleneamines with average molecular weight in the range from 200 to 500 g/mol, in particular Jeffamine® D-230, Jeffamine® D-400, and Jeffamine® T-403.

Preference is given among these to 1,6-hexanediamine, 1-amino-3-aminomethyl-3,5,5-trimethylcyclohexane, 2-(2-aminoethoxy)ethanol, polyoxypropylenediamine with average molecular weight about 230 g/mol, and polyoxypropylenetriamine with average molecular weight about 440 g/mol.

Most preference is given to 1-amino-3-aminomethyl-3,5,5-trimethylcyclohexane.

A particularly suitable aldehyde of the formula (III) is 2,2-dimethyl-3-lauroyloxypropanal.

Suitable aldimines of the formula (I) are in particular selected from the group consisting of N,N'-bis(2,2-dimethyl-3-lauroyloxypropylidene)hexamethylene-1,6-diamine, N,N'-bis(2,2-dimethyl-3-lauroyloxypropylidene)-3-aminomethyl-3,5,5-trimethylcyclohexylamine, N-2,2-dimethyl-3-lauroyloxypropylidene-2-(2-aminoethoxy)ethanol, N,N'-bis(2,2-dimethyl-3-lauroyloxypropylidene) polyoxypropylenediamine with average molecular weight in the range from 710 to 810 g/mol, and N,N',N''-tris(2,2-dimethyl-3-lauroyloxypropylidene)polyoxypropylenetriamine with average molecular weight in the range from 1190 to 1290 g/mol.

Particularly suitable aldimines of the formula (I) are N,N'-bis(2,2-dimethyl-3-lauroyloxypropylidene)hexamethylene-1,6-diamine and/or N,N'-bis(2,2-dimethyl-3-lauroyloxypropylidene)-3-aminomethyl-3,5,5-trimethylcyclohexylamine. These aldimines give compositions with particularly high strength values.

N,N'-bis(2,2-dimethyl-3-lauroyloxypropylidene)hexamethylene-1,6-diamine tends to give very particularly high strength values, and N,N'-bis(2,2-dimethyl-3-lauroyloxypropylidene)-3-aminomethyl-3,5,5-trimethylcyclohexylamine achieves particularly long open times.

The aldimine of the formula (I) can be present as constituent of the first component or as constituent of the second component, or in both components. It is preferably a constituent of the first component.

In the event that m is 1, the aldimine of the formula (I) is either a constituent of the first component or is present in a form reacted with MDI in the second component, for example, in the form depicted in the following formula:

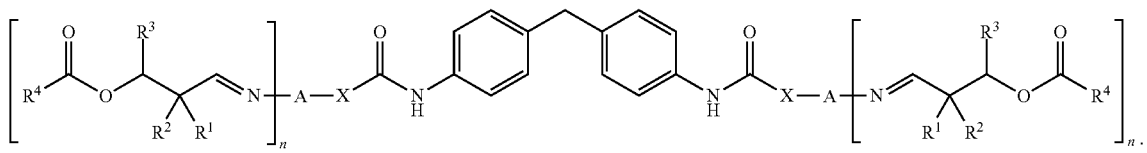

The quantity of the aldimine of the formula (I) present in the composition is, for example, preferably such that from 5% to 50%, preferably from 10% to 30%, of the isocyanate groups present can crosslink by way of the aldimine of the formula (I).

The composition preferably additionally comprises at least one catalyst for the reaction of hydroxy groups with isocyanate groups.

Compounds suitable for this purpose are organotin(IV) compounds such as in particular dibutyltin diacetate, dibutyltin dilaurate, dimethyltin dilaurate, dibutyltin dichloride, dibutyltin diacetylacetonate, or dioctyltin dilaurate.

However, preference is given to compounds of iron(III), bismuth(III), and zirconium(IV), particularly complex compounds of iron(III), bismuth(III), and zirconium(IV). These complex compounds can be produced by known processes starting from, for example, iron(III) oxide, bismuth(III) oxide, or zirconium(IV) oxide. With these complex compounds, the composition cures rapidly and substantially without formation of bubbles, to give a high-strength non-tacky material.

It is particularly preferable that at least one of the two components of the composition includes a zirconium(IV) compound, in particular a zirconium(IV) complex compound. With zirconium(IV) compounds as catalyst, the composition has long pot life and hardens rapidly.

Suitable ligands for complex compounds of iron(III), bismuth(III), or zirconium(IV) are for example:

- alcoholates, in particular methanolate, ethanolate, propanolate, isopropanolate, butanolate, tert-butanolate, isobutanolate, pentanolate, neopentanolate, hexanolate, or octanolate;
- carboxylates, in particular formiate, acetate, propionate, butanoate, isobutanoate, pentanoate, hexanoate, cyclohexanoate, heptanoate, octanoate, 2-ethyl hexanoate, nonanoate, decanoate, neodecanoate, undecanoate, dodecanoate, lactate, oleate, citrate, benzoate, salicylate, or phenylacetate;
- 1,3-diketonates, in particular acetylacetonate (2,4-pentanedionate), 2,2,6,6-tetramethyl-3,5-heptanedionate, 1,3-diphenyl-1,3-propanedionate (dibenzoyl-methane), 1-phenyl-1,3-butanedionate, or 2-acetylcyclohexanonate;
- oxinate;
- 1,3-ketoesterates, in particular methyl acetoacetate, ethyl acetoacetate, ethyl 2-methylacetoacetate, ethyl 2-ethylacetoacetate, ethyl 2-hexylacetoacetate, ethyl 2-phenylacetoacetate, propyl acetoacetate, isopropyl acetoacetate, butyl acetoacetate, tert-butyl acetoacetate, ethyl 3-oxovalerate, ethyl 3-oxohexanoate, or ethyl 2-oxocyclohexanecarboxylate; and
- 1,3-ketoamidates, in particular N,N-diethyl-3-oxobutanamidate, N,N-dibutyl-3-oxo-butanamidate, N,N-bis(2-ethylhexyl)-3-oxobutanamidate, N,N-bis(2-methoxyethyl)-3-oxo-butanamidate, N,N-dibutyl-3-oxo-heptanamidate, N,N-bis(2-methoxyethyl)-3-oxo-heptanamidate, N,N-bis(2-ethylhexyl)-2-oxocyclopentanecarboxamidate, N,N-dibutyl-3-oxo-3-phenylpropanamidate, N,N-bis(2-methoxyethyl)-3-oxo-3-phenylpropanamidate, or N-polyoxyalkylene-1,3-ketoamidate such as in particular acetoamidates of polyoxyalkyleneamines having one, two, or three amino groups and molecular weight up to 5000 g/mol, in particular the following products obtainable with trademark Jeffamine® from Huntsman SD-231, SD-401, SD-2001, ST-404, D-230, D-400, D-2000, T-403, M-600, and XTJ-581.

Particularly preferred zirconium(IV) complex compounds are selected from the group consisting of zirconium(IV) tetrakis(acetate), zirconium(IV) tetrakis(octanoate), zirconium(IV) tetrakis(2-ethylhexanoate), zirconium(IV) tetrakis(neodecanoate), zirconium(IV) tetrakis(acetylacetonate), zirconium(IV) tetrakis(1,3-diphenylpropane-1,3-dionate), zirconium(IV) tetrakis(ethylacetoacetate), zirconium(IV) tetrakis(N,N-diethyl-3-oxobutanamidate), and zirconium(IV) complex compounds having various abovementioned ligands.

The catalyst for the reaction of hydroxy groups with isocyanate groups can be present as constituent of the first and/or of the second component. It is preferably a constituent of the first component.

The composition preferably additionally includes at least one catalyst for the hydrolysis of the aldimine. Compounds suitable for this purpose are in particular organic acids, for example carboxylic acids such as benzoic acid, salicylic acid, or 2-nitrobenzoic acid, organic carboxylic anhydrides such as phthalic anhydride, hexahydrophthalic anhydride, and hexahydromethylphthalic anhydride, organic sulfonic acids such as methanesulfonic acid, p-toluenesulfonic acid, or 4-dodecylbenzenesulfonic acid, sulfonic esters, other organic or inorganic acids, silyl esters of organic carboxylic acids, or mixtures of the abovementioned acids and esters. Particular preference is given to carboxylic acids, in particular aromatic carboxylic acids such as benzoic acid, 2-nitrobenzoic acid, and in particular salicylic acid.

The catalyst for the hydrolysis of the aldimine is preferably a constituent of the first component.

The composition preferably additionally includes other additions commonly used for polyurethane liquid membranes. In particular, the following auxiliaries and additional substances can be present.

- inorganic and organic fillers, in particular ground or precipitated calcium carbonates which optionally have been coated with fatty acids, in particular with stearates, barite (heavy spar), powdered quartz, quartz sand, dolomite, wollastonite, kaolin, calcined kaolin, phyllosilicates such as mica or talc, zeolites, aluminum hydroxides, magnesium hydroxide, silicas, inclusive of fine-particle silicas from pyrolysis processes, cements, gypsum, fly ash, industrially produced carbon blacks, graphite, metal powders such as aluminum, copper, iron, silver, or steel, PVC powder, or hollow spheres;
- fibers, in particular glass fibers, carbon fibers, metal fibers, ceramic fibers, synthetic fibers such as polyamide fibers or polyethylene fibers, or natural fibers such as wool, cellulose, hemp, or sisal;
- dyes;
- inorganic or organic pigments, for example titanium dioxide, chromium oxide, or iron oxides;
- other catalysts which accelerate the reaction of the isocyanate groups, in particular compounds of zinc, manganese, chromium, cobalt, copper, nickel, molybdenum, lead, cadmium, mercury, antimony, vanadium, titanium, and potassium, in particular zinc(II) acetate, zinc(II) 2-ethylhexanoate, zinc(II) laurate, zinc(II) acetylacetonate, cobalt(II) 2-ethylhexanoate, copper(II) 2-ethylhexanoate, nickel(II) naphthenate, aluminum lactate, aluminum oleate, diisopropoxytitanium bis (ethylacetoacetate), and potassium acetate; compounds comprising tertiary amino groups, in particular 2,2'-dimorpholino-diethyl ether, N-ethyldiisopropylamine, N,N,N',N'-tetramethylalkylenediamine, pentamethylalkylenetriamine, and higher homologs thereof, bis(N,N-diethylaminoethyl) adipate, tris(3-dimethylaminopropyl)amine, 1,4-diazabicyclo[2.2.2]octane (DABCO), 1,8-diazabicyclo[5.4.0]undec-7-ene (DBU), 1,5-diazabicyclo[4.3.0]non-5-ene (DBN), N-alkylmorpholines, N,N'-dimethylpiperazines; nitrogen-aromatic compounds such as 4-dimethylaminopyridine, N-methylimidazole, N-vinylimidazole, or 1,2-dimethylimidazole; organic ammonium compounds such as benzyltrimethylammonium hydroxide or alkoxylated tertiary amines; compounds known as "delayed-action" catalysts, which are modified forms of known metal catalysts or of known amine catalysts; and also combinations of the compounds mentioned, in particular of metal compounds and of tertiary amines;
- additives such as in particular wetting agents, leveling agents, antifoams, deaerating agents, stabilizers with respect to oxidation, heat, light, and UV radiation, biocides, desiccants such as in particular molecular sieve powder, adhesion promoters such as in particular organoalkoxysilanes, rheology modifiers such as in particular phyllosilicates, hydrogenated castor oil, polyamides, polyamide waxes, polyurethanes, urea compounds, fumed silicas, hydrophobically modified polyoxyethylenes, or derivatives of castor oil;
- plasticizers, in particular phthalates, trimellitates, adipates, sebacates, azelates, citrates, benzoates, acetylated glycerol, or monoglycerides, or hydrocarbon resins, or diesters of ortho-cyclohexanedicarboxylic acid;
flame-retardant substances, in particular the abovementioned fillers aluminum hydroxide and magnesium hydroxide, and also in particular organic phosphoric esters such as in particular triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris (2-ethylhexyl) phosphate, tris(chloroisopropyl) phosphate, tris(chloropropyl) phosphate, isopropylated triphenyl phosphate, mono-, bis-, and tris(isopropylphenyl) phosphates having different degrees of isopropylation, resorcinol bis(diphenyl phosphate), bisphenol A bis(diphenyl phosphate), or ammonium polyphosphates, melamine and melamine derivatives such as phosphates or isocyanurates, expanding graphites, zinc borates, or antimony trioxide.

These additions can be present as constituent of the first or of the second component. Substances reactive with isocyanate groups are preferably a constituent of the first component. It can be advisable to dry certain constituents chemically or physically before mixing into the respective component.

The composition is preferably in essence free from volatile solvents. In particular, it includes, for example at most 1% by weight, preferably at most 0.5% by weight, of volatile solvents, particularly preferably being entirely free from volatile solvents. The expression "volatile solvent" here means a liquid organic compound with vapor pressure at least 0.01 kPa at a temperature of 293.14 K which is not reactive toward isocyanates.

The composition preferably includes at least one inorganic filler.

The ratio of the groups reactive toward isocyanate groups, particular examples being hydroxy groups, primary and secondary amino groups, and aldimino groups, to the isocyanate groups in the composition is suitably in the exemplar range from 0.5 to 1.1, preferably in the range from 0.7 to 1.05, particularly preferably in the range from 0.8 to 1.0, in particular about 0.95.

A preferred first component includes:
at least one polymer polyol,
at least one diol chain extender,
at least one aldimine of the formula (I), and
optionally other polyols,
where the proportion of solid polymer from the polymer polyol, based on the entirety of polymer polyol and other polyols, is in the range from 5 to 30% by weight, in particular from 8 to 25% by weight.

he quantity present here of the polymer polyol, of the diol chain extender, of the aldimine of the formula (I), and of other polyols is such that of the total number of their groups reactive toward isocyanates, for example:
from 10% to 50%, in particular from 20% to 40%, derive from the polymer polyol and from other polyols optionally present,
from 20% to 80%, in particular from 40% to 70%, derive from the diol chain extender, and
from 5% to 50%, in particular from 10% to 30%, derive from the aldimine of the formula (I).

It is preferable that the viscosity of the first component of the composition at 25° C. is in the exemplary range from 1 to 6 Pa·s, preferably from 1 to 4 Pa·s.

The first and the second components of the composition are produced separately from one another. The constituents of the respective component here are mixed with one another with exclusion of moisture in such a way as to produce a macroscopically homogeneous liquid. Each component is stored in a separate vessel that prevents ingress of moisture. A suitable vessel is in particular a full-aperture drum or other drum, a container, a bucket, a can, a bag, a canister, or a bottle. The components are storage-stable, and this means that they can be stored in the respective vessel for several months or for up to a year or longer before they are used, without any change of their properties to an extent that is relevant for their use.

For use of the composition, the two components are mixed with one another just before, or during, application. The mixing ratio is preferably selected in such a way that the ratio of the groups reactive toward isocyanates to the isocyanate groups is suitable, as described above. An exemplary mixing ratio of the first to the second component in parts by weight is in the range from about 1:1 to 20:1, in particular 2:1 to 10:1.

The mixing of the two components is achieved by using a suitable mixer, for example a twin-shaft mixer, where the individual components are suitably subjected to preliminary processing in the correct mixing ratio. It is equally possible to carry out continuous processing in a machine with use of a two-component metering system, with static or dynamic mixing of the components. Care should be taken to maximize homogeneity of mixing of the two components during the mixing procedure. If mixing is inadequate, local deviations from the advantageous mixing ratio occur, and this can result in impairment of mechanical properties, and/or formation of bubbles. If mixing is carried out before application, it is necessary to ensure that the period between mixing of the components and application is not excessive, because an excessive period can here can lead to problems, for example poor flow, or retarded or inadequate development of adhesion to the substrate. The mixing is in particular achieved at ambient temperature, which is for example in the range of about 5 to 50° C., preferably about 10 to 35° C.

Hardening via chemical reaction begins with the mixing of the two components. Hydroxy groups and primary and secondary amino groups that are present react here with isocyanate groups that are present. Aldimino groups react with isocyanate groups that are present as soon as they come into contact with moisture. The water required for the hydrolysis of the aldimino groups here can at least to some extent be present in the composition or diffuses from the surroundings in the form of moisture from the environment, in particular in the form of humidity or substrate moisture, into the mixed composition. Excess isocyanate groups react with moisture that is present. These reactions cause curing of the composition to give a robust material. This procedure is also termed crosslinking. During and after hardening, aldehyde liberated from the aldimino groups remains in the composition, where it acts as odorless substance with a degree of plasticizing effect. Because it has excellent compatibility in the composition, it exhibits no tendency of any kind toward separation or migration.

The present disclosure moreover provides a hardened composition obtained from a composition as described above after mixing of the two components and hardening of these.

The freshly mixed, still liquid composition is applied as coating, within its open time, to a level or slightly inclined area, for example by pouring onto a substrate followed by distribution over an area until the desired layer thickness has been reached, for example by use of a roller, a bar, a toothed trowel, or a spatula.

The expression "open time" or "pot life" here means the period between mixing of the components and the end of suitability of the composition for use. An exemplary criterion for the end of pot life can be doubling of viscosity.

It is preferable that the viscosity of the composition at 25° C. one minute after mixing is in the exemplary range from 0.5 to 2 Pa·s, preferably from 0.5 to 1.5 Pa·s. This permits very successful use of the composition as liquid membrane. It is preferable that the composition is self-leveling, i.e. that after application by means of a roller, toothed trowel, toothed roller, or the like it flows spontaneously to give a level surface.

A single operation can apply a layer thickness in the exemplar range from 0.5 to 3 mm, in particular from 1.0 to 2.5 mm.

The composition can be applied to various substrates, and on hardening forms a resilient layer providing static and dynamic bridging over cracks. It protects the underlying material from ingress of water, acids, alkalis, oil, gasoline, de-icing salts, etc., and also from abrasion and wear, and can additionally serve to improve aesthetics.

The composition described can be applied in one or more layers. It is for example, applied in one layer. One or more topcoats can be applied to the composition described. It is preferable to apply a sealing system as uppermost or final layer.

The expression "sealing system" here means a transparent or pigmented, high-quality coating which is applied as uppermost thin layer to another coating. It protects, and improves the quality of, the surface of the latter, and seals pores therein. An exemplary layer thickness here in the dry state is in the range from 0.03 to 0.3 mm.

The sealing system provides additional protection from UV light, oxidation, or microbial colonization, provides possibilities for esthetic design, protects the coating from mechanical damage, and/or prevents soiling, and/or serves for the fixing of aggregates scattered into the material.

Aggregates such as in particular quartz sand can be scattered into the composition just after application. To this end, quartz sand is scattered into the composition which has been applied to an area but remains liquid, in such a way that after hardening said sand adheres at least to some extent to the hardened composition or has been bonded at least to some extent therein. An excess of, or a defined quantity of, quartz sand can be scattered into the material. If an excess of sand is used, sand not adhering to the composition is removed after hardening.

The composition can be used for the protection of floors, in particular as coating on balconies, terraces, bridges, parking lots, or other outdoor areas, or for the sealing of roofs, in particular flat roofs or slightly inclined roof areas or roof gardens, or in the interior of buildings for waterproofing, for example under tiles or ceramic panels in wetrooms or kitchens, or as floorcovering in kitchens, industrial buildings or production areas, or as seal in collection troughs of any type, or in conduits or ducts, or waste-water treatment systems, or else as casting composition for cavity sealing, as seam seal, or as protective coating for, by way of example, pipes. It can also be used for repair purposes as seal or coating, for example for leaking roof membranes or for floorcoverings that are no longer functional, or in particular as repair composition for high-reactivity spray seals.

A preferred use is the use in a floor-coating system containing:
optionally a primer and/or a priming coat, and/or a repair composition or leveling composition,
at least one layer of the composition described, onto which a defined quantity of, or an excess of, quartz sand or other aggregates can have been scattered,
optionally a topcoat, onto which a defined quantity of, or an excess of, quartz sand or other aggregates can have been scattered, and
a sealing system.

It is preferable that quartz sand has been scattered onto one of the layers mentioned. This floor-coating system is particularly suitable for floors that can withstand pedestrian traffic, for example those on parking lots, balconies, terraces, or bridges.

Another preferred use is the use in a roof-sealing system including:
optionally a primer and/or a priming coat, and/or a repair composition or leveling composition,
at least one layer of thickness from 0.5 to 5 mm of the composition described,
optionally a topcoat, and
optionally a sealing system.

This roof-seal system is particularly suitable for the sealing of flat or slightly inclined roofs, and for the repair of existing roof seals of any type which have become damaged.

Suitable substrates to which the composition can be applied are for example:
foamed concrete or other concrete, mortar, brick, roof tile, slate, gypsum plaster, anhydrite, or natural stone such as granite or marble;
composition intended for repair or leveling and based on PCC (polymer-modified cement mortar) or on ECC (epoxy-resin-modified cement mortar);
metals and alloys such as aluminum, copper, iron, steel, nonferrous metals, inclusive of surface-enhanced metals, and alloys, for example galvanized or chromed metals;
asphalt or bitumen;
plastics such as PVC, ABS, PC, PA, polyester, PMMA, SAN, epoxy resins, phenolic resins, PUR, POM, PO, PE, PP, EPM, or EPDM, in each case untreated or surface-treated by use of plasma, corona, or flame; in particular PVC membranes, PO (FPO, TPO) membranes, or EPDM membranes;
insulation foams, in particular made of EPS, XPS, PUR, PIR, rock wool, or glass wool, or of foamed glass;
coated substrates such as lacquered tiles, coated concrete, or powder-coated metals.

The substrates can, if necessary, be pretreated before application of the composition, for example by physical and/or chemical cleaning processes, for example grinding, sandblasting, shotblasting, brushing, suction cleaning, or blow cleaning, or high- or very-high-pressure water jets, and/or via treatment with cleaners or solvents, and/or application of an adhesion promoter, an adhesion-promoter solution, or a primer.

Application and hardening produces an item which has been coated or sealed with a composition of the present disclosure. The article is in particular construction work, in particular construction work associated with structural or civil engineering, or is an industrially manufactured product, for example a pipe.

The composition described features advantageous properties. It is solvent-free and has little odor, and is free from volatile monomeric isocyanates. By virtue of its low viscosity and long open time, it can be used with excellent results in manual applications, and is fully leveling when used as surface coating. It cures rapidly and without difficulty under a wide range of conditions in respect of temperature and moisture, producing a resilient material with high strength, extensibility, and tear strength, with moderate modulus of elasticity, and it has excellent weathering resistance. The composition is therefore particularly suitable as liquid membrane for the sealing of floors and roofs in construction work or for the repair of sealing membranes and spray coatings.

EXAMPLES

Embodiments are listed below with the intention of providing a more detailed explanation of embodiments described herein. The invention is not, of course, restricted to these embodiments that are described.

1. Commercially Available Substances Used:

| | |
|---|---|
| Lupranol ® 4003/1 | EO-end-capped polyoxypropylenetriol with 45% by weight of grafted SAN polymer, OH number 20.0 mg KOH/g (from BASF) |
| Desmophen ® 5028 GT | EO-end-capped polyoxypropylenetriol with 20% by weight of PHD polymer, OH number 28.5 mg KOH/g (from Bayer MaterialScience) |
| Voranol ® CP 4755 | EO-end-capped polyoxypropylenetriol, OH number 34.7 mg KOH/g (from Dow) |
| Castor oil | OH number 165 mg KOH/g (from Alberdingk Boley) |
| Isonate ® M 143 | Modified diphenylmethane 4,4'-diisocyanate comprising MDI-carbodiimide adducts, liquid at room temperature, NCO content 29.4% by weight (from Dow) |
| Desmodur ® VH 20 N | Modified diphenylmethane 4,4'-diisocyanate comprising MDI-carbodiimide adduct, reacted with a small quantity of polyol, liquid at room temperature; NCO content 24.5% by weight (from Bayer MaterialScience) |
| Powdered quartz | Sikron ® SF 600 (from Quarzwerke GmbH) |
| Zeolite paste | 3Å molecular sieve powder (from Zeochem), 50% by weight in castor oil |
| K-Kat ® A-209 | Zirconium chelate complex in reactive diluents and tert-butyl acetate, zirconium content 3.5% by weight (from King Industries) |
| DBTDL | Dibutyltin dilaurate (from Sigma Aldrich) |

2. Aldimines Used:

Amine content (total content of free and blocked amino groups inclusive of aldimino groups) was determined by means of titration (with 0.1N $HClO_4$ in acetic acid with crystal violet), and is stated in mmol of N/g.

Aldimine 1: N,N'-bis(2,2-dimethyl-3-lauroyloxypropylidene)-3-aminomethyl-3,5,5-trimethylcyclohexylamine 598 g (2.1 mol) of 2,2-dimethyl-3-lauroyloxypropanal were used as initial charge in a round-bottomed flask under nitrogen. 170.3 g (1 mmol) of 3-aminomethyl-3,5,5-trimethylcyclohexylamine (Vestamin® IPD from Evonik) were added, with stirring, and then the volatile constituents were removed at 80° C. at 10 mbar. This gave 732 g of an almost colorless liquid with amine content 2.73 mmol of N/g, corresponding to a calculated equivalent weight of about 367 g/eq.

Aldimine 2: N,N'-bis(2,2-dimethyl-3-lauroyloxypropylidene)hexamethylene-1,6-diamine 622 g (2.2 mmol) of 2,2-dimethyl-3-lauroyloxypropanal and 166.0 g (1 mol) of hexamethylene-1,6-diamine solution (70% by weight in water) were reacted as described for aldimine 1. This gave 702 g of an almost colorless liquid with amine content 2.98 mmol of N/g, corresponding to a calculated equivalent weight of about 336 g/eq.

3. Production of Polyurethane Liquid Membranes

For each liquid membrane, the stated quantities (in parts by weight) of the ingredients stated in tables 1 to 6 of the first component ("component 1") were processed by means of a centrifugal mixer (SpeedMixer™ DAC 150, FlackTek Inc.) with exclusion of moisture to give a homogeneous liquid, and stored. The quantity stated in tables 1 to 6 of the second component was then added to the first component, and the two components were processed for 3 minutes by means of the centrifugal mixer, with exclusion of moisture, to give a homogeneous liquid, which was immediately tested as follows:

Viscosity was measured in a thermostat-controlled Rheotec RC30 cone-on-plate viscometer (cone diameter 50 mm, cone angle 1°, cone-tip-to-plate distance 0.05 mm, shear rate 10 $s^{-1}$).

Pot life was determined by using a spatula to assess the mobility of 20 grams of the mixed liquid membrane at regular intervals. The pot life value was read when the liquid membrane became too thick for practical use.

Flow-table value was determined by casting 80 g of the mixed liquid membrane onto a PTFE-coated membrane immediately after mixing of the two components, and measuring the average diameter of the composition after 24 h.

For determination of mechanical properties, the liquid membrane was cast onto a PTFE-coated membrane to give a membrane of thickness 2 mm, the latter was stored for 14 days under standard conditions of temperature and humidity, dumbbells of length 75 mm, the length and width of the narrow part of these being respectively 30 mm and 4 mm, were punched out of the membrane, and these were tested for tensile strength (breaking force), elongation at break and modulus of elasticity (at from 0.5 to 5% elongation) in accordance with DIN EN 53504 at a tensile testing rate of 200 mm/min. Test samples for determination of tear strength were also punched out of the material, and tested in accordance with DIN ISO 34 at a tensile testing rate of 500 mm/min. Appearance and formation of bubbles were assessed visually on the membranes produced.

Tables 1 to 6 state the results.

The liquid membranes F 1 to F 26 are inventive examples. The liquid membranes Ref 1 to Ref 12 are comparative examples.

TABLE 1

Composition (in parts by weight) and properties of F 1 to F 5 and Ref 1 and Ref 2.

| Liquid membrane | Ref 1 | F 1 | F 2 | F 3 | Ref 2 | F 4 | F 5 |
|---|---|---|---|---|---|---|---|
| Component 1: | | | | | | | |
| Lupranol ® 4003/1 | — | 10.00 | 20.00 | 30.00 | — | 10.00 | 20.00 |
| Voranol ® CP 4755 | 46.79 | 41.29 | 35.79 | 30.29 | 44.54 | 39.04 | 33.54 |
| 1,4-Butanediol | 2.75 | 2.75 | 2.75 | 2.75 | 2.50 | 2.50 | 2.50 |
| Aldimine 1 | 6.00 | 6.00 | 6.00 | 6.00 | 8.50 | 8.50 | 8.50 |
| Powdered quartz | 44.00 | 39.50 | 35.00 | 30.50 | 44.00 | 39.50 | 35.00 |
| K-Kat ® A-209[1] | 0.13 | 0.13 | 0.13 | 0.13 | 0.13 | 0.13 | 0.13 |
| Salicylic acid[1] | 0.33 | 0.33 | 0.33 | 0.33 | 0.33 | 0.33 | 0.33 |
| Component 2: | | | | | | | |
| Isonate ® M 143 | 16.00 | 16.00 | 16.00 | 16.00 | 16.00 | 16.00 | 16.00 |
| Polymer content[2] | 0 | 8.8 | 16.1 | 22.4 | 0 | 9.2 | 16.8 |
| Viscosity (25° C.)[3] | 2.26 | 2.28 | 2.48 | 2.75 | 2.48 | 2.40 | 2.65 |
| Pot life [min] | 75 | 75 | 75 | 70 | 70 | 80 | 75 |
| Flow-table value [cm] | 20.4 | 20.1 | 20.7 | 21.0 | 20.0 | 20.0 | 21.1 |
| Tensile strength [MPa] | 3.9 | 4.6 | 4.8 | 5.0 | 3.8 | 4.7 | 5.2 |
| Elongation at break [%] | 250 | 250 | 230 | 210 | 230 | 275 | 220 |
| Modulus of elasticity [MPa] | 8.6 | 9.3 | 8.0 | 7.2 | 8.5 | 9.7 | 9.1 |
| Tear strength [N/mm] | 14.1 | 13.9 | 13.7 | 13.3 | 14.5 | 14.6 | 14.5 |
| Appearance, bubble formation | tack-free, very little | tack-free, very little | tack-free, none | tack-free, none | tack-free, very little | tack-free, very little | tack-free, very little |

[1]5% in dioctyl adipate
[2]solid polymer from polymer polyol, based on entirety of polymer polyol and other polyol [% by weight]
[3]of component 1 [Pa · s]

TABLE 2

Composition (in parts by weight) and properties of F 6 and F 7 and Ref 3 to Ref 7.

| Liquid membrane | Ref 3 | F 6 | F 7 | Ref 4 | Ref 5 | Ref 6 | Ref 7 |
|---|---|---|---|---|---|---|---|
| Component 1: | | | | | | | |
| Lupranol ® 4003/1 | — | 10.00 | 20.00 | — | 10.00 | 20.00 | 30.00 |
| Voranol ® CP 4755 | 42.29 | 36.79 | 31.29 | 52.52 | 47.02 | 41.52 | 36.02 |
| 1,4-Butanediol | 2.25 | 2.25 | 2.25 | 3.35 | 3.35 | 3.35 | 3.35 |
| Aldimine 1 | 11.00 | 11.00 | 11.00 | — | — | — | — |
| Powdered quartz | 44.00 | 39.50 | 35.00 | 44.00 | 39.50 | 35.00 | 30.50 |
| K-Kat ® A-209[1] | 0.13 | 0.13 | 0.13 | 0.13 | 0.13 | 0.13 | 0.13 |
| Salicylic acid[1] | 0.33 | 0.33 | 0.33 | — | — | — | — |
| Component 2: | | | | | | | |
| Isonate ® M 143 | 16.00 | 16.00 | 16.00 | 16.00 | 16.00 | 16.00 | 16.00 |
| Polymer content[2] | 0 | 9.6 | 17.5 | 0 | 7.9 | 14.6 | 20.4 |
| Viscosity (25° C.)[3] | 2.24 | 2.87 | 3.18 | 2.58 | 2.83 | 3.11 | 3.44 |
| Pot life [min] | 75 | 70 | 60 | 80 | 80 | 85 | 90 |
| Flow-table value [cm] | 20.1 | 21.0 | 20.6 | 19.6 | 19.8 | 21.7 | 20.5 |
| Tensile strength [MPa] | 4.8 | 5.1 | 5.7 | 0.9 | 0.9 | 0.9 | 1.1 |
| Elongation at break [%] | 225 | 215 | 200 | 80 | 75 | 115 | 130 |
| Modulus of elasticity [MPa] | 10.2 | 9.9 | 10.6 | 8.3 | 6.8 | 5.8 | 5.9 |
| Tear strength. [N/mm] | 16.0 | 15.8 | 15.8 | 6.2 | 6.0 | 6.6 | 5.7 |
| Appearance bubble formation | tack-free, very little | tack-free, very little | tack-free, none | tack-free, very little | tack-free, very little | tack-free, none | tack-free, none |

[1]5% in dioctyl adipate
[2]solid polymer from polymer polyol, based on entirety of polymer polyol and other polyol [% by weight]
[3]of component 1 [Pa · s]

TABLE 3

Composition (in parts by weight) and properties of F 8 to F 13 and Ref 8 and Ref 9.

| Liquid membrane | Ref 8 | F 8 | F 9 | F 10 | F 11 | Ref 9 | F 12 | F 13 |
|---|---|---|---|---|---|---|---|---|
| Component 1: | | | | | | | | |
| Lupranol ® 4003/1 | — | 10.00 | 30.00 | 10.00 | 30.00 | — | 10.00 | 10.00 |
| Voranol ® CP 4755 | 46.85 | 41.35 | 30.35 | 34.12 | 23.12 | 46.82 | 41.32 | 21.29 |
| Castor oil | — | — | — | — | — | — | — | 20.00 |
| 1,4-Butanediol | 2.72 | 2.72 | 2.72 | 1.92 | 1.92 | 2.72 | 2.72 | 2.75 |
| Aldimine 1 | 4.20 | 4.20 | 4.20 | 11.0 | 11.0 | 4.20 | 4.20 | 6.0 |
| Aldimine 2 | 1.80 | 1.80 | 1.80 | — | — | 1.80 | 1.80 | — |
| Powdered quartz | 44.00 | 39.50 | 30.50 | 36.50 | 27.50 | 44.00 | 39.50 | 39.50 |
| Zeolite paste | — | — | — | 6.00 | 6.00 | — | — | — |
| K-Kat ® A-209[1] | — | — | — | 0.13 | 0.13 | 0.13 | 0.13 | 0.13 |
| DBTDL | 0.10 | 0.10 | 0.10 | — | — | — | — | — |
| Salicylic acid[1] | 0.33 | 0.33 | 0.33 | 0.33 | 0.33 | 0.33 | 0.33 | 0.33 |
| Component 2: | | | | | | | | |
| Isonate ® M 143 | 16.00 | 16.00 | 16.00 | 16.00 | 16.00 | — | — | — |
| Desmodur ® VH 20 N | — | — | — | — | — | 19.0 | 19.0 | 28.0 |
| Polymer content[2] | 0 | 8.8 | 22.4 | 10.2 | 25.4 | 0 | 8.8 | 8.8 |
| Viscosity (25° C.)[3] | 2.24 | 2.05 | 2.64 | 2.38 | 2.89 | n.d. | n.d. | 1.95 |
| Pot life [min] | 20 | 20 | 20 | >150 | >150 | 70 | 65 | 45 |
| Flow-table value [cm] | 19.5 | 19.6 | 19.9 | 21.0 | 21.2 | 19.6 | 19.6 | 20.0 |
| Tensile strength [MPa] | 7.5 | 8.2 | 9.3 | 7.6 | 8.8 | 5.9 | 7.3 | 11.8 |
| Elongation at break [%] | 210 | 195 | 200 | 275 | 240 | 220 | 245 | 145 |
| Modulus of elasticity [MPa] | 14.1 | 13.7 | 13.7 | 11.8 | 11.8 | 11.3 | 12.8 | 18.2 |
| Tear strength [N/mm] | 13.2 | 13.1 | 13.1 | 12.3 | 12.7 | 13.3 | 14.4 | 14.3 |
| Appearance, bubble formation | tack-free, little | tack-free, little | tack-free, little | tack-free, none | tack-free, none | tack-free, very little | tack-free, very little | tack-free, very little |

"n.d." means "not determined"
[1] 5% in dioctyl adipate
[2] solid polymer from polymer polyol, based on entirety of polymer polyol and other polyol [% by weight]
[3] of component 1 [Pa·s]

TABLE 4

Composition (in parts by weight) and properties of F 14 to F 19 and Ref 10 and Ref 11.

| Liquid membrane | Ref 10 | F 14 | F 15 | F 16 | Ref 11 | F 17 | F 18 | F 19 |
|---|---|---|---|---|---|---|---|---|
| Component 1: | | | | | | | | |
| Lupranol ® 4003/1 | — | 10.00 | 20.00 | 30.00 | — | 10.00 | 20.00 | 30.00 |
| Voranol ® CP 4755 | 49.01 | 43.53 | 38.03 | 32.53 | 46.79 | 41.29 | 35.79 | 30.29 |
| 1,4-Butanediol | 3.01 | 3.01 | 3.01 | 3.01 | 2.75 | 2.75 | 2.75 | 2.75 |
| Aldimine 1 | 3.50 | 3.50 | 3.50 | 3.50 | 6.00 | 6.00 | 6.00 | 6.00 |
| Powdered quartz | 44.00 | 39.50 | 35.00 | 30.50 | 44.00 | 39.50 | 35.00 | 30.50 |
| K-Kat ® A-209[1] | 0.13 | 0.13 | 0.13 | 0.13 | 0.13 | 0.13 | 0.13 | 0.13 |
| Salicylic acid[1] | 0.33 | 0.33 | 0.33 | 0.33 | 0.33 | 0.33 | 0.33 | 0.33 |
| Component 2: | | | | | | | | |
| Desmodur ® VH 20 N | 19.0 | 19.0 | 19.0 | 19.0 | 19.0 | 19.0 | 19.0 | 19.0 |
| Polymer content[2] | 0 | 8.4 | 15.5 | 21.6 | 0 | 8.8 | 16.1 | 22.4 |
| Pot life [min] | >95 | 80 | 85 | 85 | 75 | 75 | 80 | 80 |
| Flow-table value [cm] | 19.5 | 19.4 | 20.3 | 20.4 | 19.7 | 19.9 | 20.3 | 20.3 |
| Tensile strength [MPa] | 5.0 | 6.0 | 6.6 | 7.0 | 5.9 | 6.7 | 7.4 | 8.1 |
| Elongation at break [%] | 260 | 255 | 250 | 225 | 260 | 270 | 240 | 230 |
| Modulus of elasticity [MPa] | 13.9 | 13.0 | 11.9 | 12.7 | 12.9 | 12.9 | 13.5 | 13.2 |
| Tear strength [N/mm] | 15.2 | 14.9 | 14.0 | 14.0 | 14.8 | 14.7 | 14.7 | 14.2 |
| Appearance, bubble formation | tack-free, very little | tack-free, very little | tack-free, very little | tack-free, very little | tack-free, very little | tack-free, very little | tack-free, very little | tack-free, very little |

[1] 5% in dioctyl adipate
[2] solid polymer from polymer polyol, based on entirety of polymer polyol and other polyol [% by weight]

TABLE 5

Composition (in parts by weight) and properties of F 20 to F 26 and Ref 12.

| Liquid membrane | Ref 12 | F 20 | F 21 | F 22 | F 23 | F 24 | F 25 | F 26 |
|---|---|---|---|---|---|---|---|---|
| Component 1: | | | | | | | | |
| Lupranol ® 4003/1 | — | 10.00 | 30.00 | — | — | — | — | — |
| Desmophen ® 5028 GT | — | — | — | 22.50 | 45.00 | 22.50 | 45.00 | 22.50 |
| Voranol ® CP 4755 | 42.26 | 36.85 | 25.85 | 28.79 | 10.79 | 26.54 | 8.54 | 24.29 |
| 1,4-Butanediol | 2.28 | 2.28 | 2.28 | 2.75 | 2.75 | 2.50 | 2.50 | 2.25 |
| Aldimine 1 | 11.0 | 11.0 | 11.0 | 6.00 | 6.00 | 8.50 | 8.50 | 11.00 |
| Powdered quartz | 44.00 | 39.50 | 30.50 | 39.50 | 35.0 | 39.50 | 35.0 | 39.50 |
| K-Kat ® A-209[1] | 0.13 | 0.13 | 0.13 | 0.13 | 0.13 | 0.13 | 0.13 | 0.13 |
| Salicylic acid[1] | 0.33 | 0.33 | 0.33 | 0.33 | 0.33 | 0.33 | 0.33 | 0.33 |
| Component 2: | | | | | | | | |
| Desmodur ® VH 20 N | 19.0 | 19.0 | 19.0 | — | — | — | — | — |
| Isonate ® M 143 | — | — | — | 16.00 | 16.00 | 16.00 | 16.00 | 16.00 |
| Polymer content[2] | 0 | 9.6 | 24.2 | 8.8 | 16.1 | 9.2 | 16.8 | 9.6 |
| Viscosity (25° C.)[3] | n.d. | n.d. | n.d. | 3.34 | 5.17 | 2.93 | 4.67 | 3.17 |
| Pot life [min] | 80 | 90 | 80 | 70 | 60 | 65 | 60 | 70 |
| Flow-table value [cm] | 20.2 | 20.1 | 20.2 | 20.2 | 19.8 | 20.8 | 20.6 | 20.6 |
| Tensile strength [MPa] | 6.6 | 7.5 | 9.7 | 4.2 | 5.2 | 5.2 | 6.1 | 6.7 |
| Elongation at break [%] | 250 | 245 | 245 | 215 | 195 | 225 | 205 | 215 |
| Modulus of elasticity [MPa] | 11.4 | 12.9 | 10.0 | 11.5 | 13.5 | 12.1 | 14.8 | 15.6 |
| Tear strength [N/mm] | 15.2 | 15.4 | 15.4 | 13.8 | 13.8 | 14.2 | 14.3 | 15.1 |
| Appearance, bubble formation | tack-free, very little | tack-free, very little | tack-free, very little | tack-free, little | tack-free, little | tack-free, little | tack-free, little | tack-free, very little |

"n.d" means "not determined"

[1] 5% in dioctyl adipate

[2] solid polymer from polymer polyol, based on entirety of polymer polyol and other polyol [% by weight]

[3] of component 1 [Pa · s]

It will therefore be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A composition composed of:
    a first component comprising:
        at least one polymer polyol which is a dispersion of a polymer that is solid at room temperature in a polyether polyol that is liquid at room temperature,
        at least one diol chain extender
        and optionally other polyols; and
    a second component comprising:
        monomeric diphenylmethane diisocyanate;
    where at least one of the first component and the second component additionally comprises at least one aldimine of the formula (I),

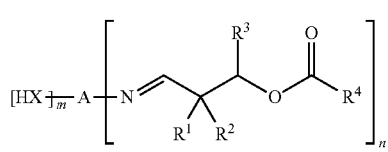

(I)

where
A is an (m+n)-valent hydrocarbon moiety which optionally comprises ether units and which has from 2 to 20 C atoms,
X is O or N—R$^5$,
R$^1$ and R$^2$ are mutually independently respectively a monovalent hydrocarbon moiety having from 1 to 12 C atoms, or together are a divalent hydrocarbon moiety which has from 4 to 12 C atoms and which is part of an optionally substituted carbocyclic ring having from 5 to 8;
R$^3$ is a hydrogen atom or is an alkyl or arylalkyl or alkoxycarbonyl moiety having from 1 to 12 C atoms;
R$^4$ is a monovalent hydrocarbon moiety which has from 6 to 20 C atoms and which optionally comprises ether units or aldehyde units;
R$^5$ is a monovalent hydrocarbon moiety which has from 1 to 30 C atoms and which optionally comprises at least one carboxylic ester group, nitrile group, nitro group, phosphonic ester group, sulfonic group or sulfonic ester group, or a group of the formula

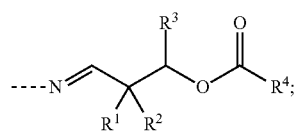

and
m is 0 or 1, and n is 1 or 2 or 3, with the proviso that m+n is 2 or 3.

2. The composition as claimed in claim 1, wherein the aldimine of the formula (I) is selected from the group consisting of:

N,N'-bis(2,2-dimethyl-3-lauroyloxypropylidene)hexamethylene-1,6-diamine, N,N'-bis(2,2-dimethyl-3-lauroyloxypropylidene)-3-aminomethyl-3,5,5-trimethylcyclohexylamine, N-2,2-dimethyl-3-lauroyloxypropylidene-2-(2-aminoethoxy)ethanol, N,N'-bis(2,2-dimethyl-3-lauroyloxypropylidene)polyoxypropylenediamine with average molecular weight in a range from 710 to 810 g/mol and N,N',N"-tris(2,2-dimethyl-3-lauroyloxypropylidene)polyoxypropylenetriamine with average molecular weight in a range from 1190 to 1290 g/mol.

3. The composition as claimed in claim 1, wherein the solid polymer is a copolymer of acrylonitrile and styrene (SAN) or is a polyurea/polyhydrazodicarbonamide (PHD) or is a polyurethane.

4. The composition as claimed in claim 1, wherein the polyether polyol is an ethylene-oxide-terminated polyoxypropylenetriol with molecular weight in a range from 1000 to 6000 g/mol.

5. The composition as claimed in claim 1, wherein the diol chain extender is selected from the group consisting of:
1,2-ethanediol, 1,2-propanediol, 1,3-propanediol, 1,2-butanediol, 1,3-butanediol, 1,4-butanediol, 2,3-butanediol, 2-methyl-1,3-propanediol, 1,5-pentanediol, 1,2-pentanediol, 2,4-pentanediol, 2-methyl-1,4-pentanediol, 2,2-dimethyl-1,3-propanediol, 1,6-hexanediol, 1,2-hexanediol, 3-methyl-1,5-pentanediol, 1,8-octanediol, 1,2-octanediol, 3,6-octanediol, 2-ethyl-1,3-hexanediol, 2,2,4-trimethyl-1,3-pentanediol, 2-butyl-2-ethyl-1,3-propanediol, 2,7-dimethyl-3,6-octanediol, 1,4-cyclohexanediol, 1,3-cyclohexanedimethanol, 1,4-cyclohexanedimethanol, diethylene glycol and dipropylene glycol.

6. The composition as claimed in claim 1, wherein the composition comprises:
at least one other polyol which is a polyether polyol or a poly(meth)acrylate polyol or which is a polyhydroxy-functional fat or oil.

7. The composition as claimed in claim 1, wherein a proportion of solid polymer from the polymer polyol, based on a entirety of polymer polyol and optionally present other polyols, is in a range from 5 to 30% by weight.

8. The composition as claimed claim 1, wherein a content of the monomeric diphenylmethane diisocyanate in the second component is in a range from 20 to 100% by weight.

9. The composition as claimed in claim 1, wherein at least one of the first component and the second component additionally comprises:
a zirconium(IV) compound as catalyst.

10. The composition as claimed in claim 1, wherein the composition is substantially free from volatile solvents.

11. The composition as claimed in claim 1, wherein the composition viscosity one minute after mixing of the first component and the second component is in a range from 0.5 to 2 Pa·s at 25° C.

12. The composition as claimed in claim 1, wherein the first and second components are mixed to form a coating or seal.

13. The composition claimed in claim 1, in combination with a floor-coating system comprising:
optionally a primer and/or a priming coat, and/or a repair composition or leveling composition;
at least one layer of the composition, onto which a defined quantity of, or an excess of, quartz sand or other aggregates can have been scattered;
optionally a topcoat, onto which a defined quantity of, or an excess of, quartz sand or other aggregates can have been scattered; and
a sealing system.

14. The composition as claimed in claim 1, in combination with a roof-sealing system comprising:
optionally a primer and/or a priming coat, and/or a repair composition or leveling composition;
at least one layer of thickness from 0.5 to 5 mm of the composition;
optionally a topcoat; and
optionally a sealing system.

15. A composition as claimed in claim 1, which has been hardened after mixing of the first and second components.

16. A composition as claimed in claim 1:
the first component comprising:
at least one polymer polyol which is a dispersion of a polymer that is solid at room temperature in a polyether polyol that is liquid at room temperature,
at least one diol chain extender; and
other polyols; and
the second component comprising:
monomeric diphenylmethane diisocyanate;
where at least one of the first component and the second component additionally comprises at least one aldimine of the formula (I),

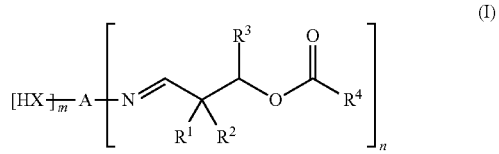

where
A is an (m+n)-valent hydrocarbon moiety which comprises ether units and which has from 2 to 20 C atoms,
X is O or N—$R^5$,
$R^1$ and $R^2$ are mutually independently respectively a monovalent hydrocarbon moiety having from 1 to 12 C atoms, or together are a divalent hydrocarbon moiety which has from 4 to 12 C atoms and which is part of an substituted carbocyclic ring having 6 C atoms;
$R^3$ is a hydrogen atom or is an alkyl or arylalkyl or alkoxycarbonyl moiety having from 1 to 12 C atoms;
$R^4$ is a monovalent hydrocarbon moiety which has from 6 to 20 C atoms and which comprises ether units or aldehyde units;
$R^5$ is a monovalent hydrocarbon moiety which has from 1 to 30 C atoms and which comprises at least one carboxylic ester group, nitrile group, nitro group, phosphonic ester group, sulfonic group or sulfonic ester group, or a group of the formula;

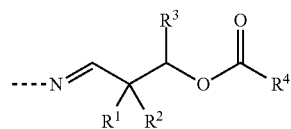

and
m is 0 or 1, and n is 1 or 2 or 3, with the proviso that m+n is 2 or 3.

17. The composition as claimed in claim 2, wherein the solid polymer is a copolymer of acrylonitrile and styrene (SAN) or is a polyurea/polyhydrazodicarbonamide (PHD) or is a polyurethane.

18. The composition as claimed in claim 17, wherein the polyether polyol is an ethylene-oxide-terminated polyoxy-propylenetriol with molecular weight in a range from 1000 to 6000 g/mol.

19. The composition as claimed in claim 18 wherein the diol chain extender is selected from the group consisting of:
   1,2-ethanediol, 1,2-propanediol, 1,3-propanediol, 1,2-butanediol, 1,3-butanediol, 1,4-butanediol, 2,3-butanediol, 2-methyl-1,3-propanediol, 1,5-pentanediol, 1,2-pentanediol, 2,4-pentanediol, 2-methyl-1,4-pentanediol, 2,2-dimethyl-1,3-propanediol, 1,6-hexanediol, 1,2-hexanediol, 3-methyl-1,5-pentanediol, 1,8-octanediol, 1,2-octanediol, 3,6-octanediol, 2-ethyl-1,3-hexanediol, 2,2,4-trimethyl-1,3-pentanediol, 2-butyl-2-ethyl-1,3-propanediol, 2,7-dimethyl-3,6-octanediol, 1,4-cyclohexanediol, 1,3-cyclohexanedimethanol, 1,4-cyclohexanedimethanol, diethylene glycol and dipropylene glycol.

20. The composition as claimed in claim 19, wherein the composition comprises:
   at least one other polyol which is a polyether polyol or a poly(meth)acrylate polyol or which is a polyhydroxy-functional fat or oil.

* * * * *